A. F. SULZER.
ANTISTATIC PHOTOGRAPHIC FILM.
APPLICATION FILED FEB. 21, 1921.

1,432,366.  Patented Oct. 17, 1922.

WITNESS

INVENTOR
Albert F. Sulzer,
BY
ATTORNEY

Patented Oct. 17, 1922.

1,432,366

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

ANTISTATIC PHOTOGRAPHIC FILM.

Application filed February 21, 1921. Serial No. 446,782.

*To all whom it may concern:*

Be it known that I, ALBERT F. SULZER, a citizen of the United States of America, residing at Rochester, in the county of Monroe and State of New York, have invented certain new and useful Improvements in Antistatic Photographic Films, of which the following is a full, clear and exact specification.

This invention relates to photographic film. The principal object of this invention is to provide a film having the usual qualities essential in commercial practice, which will also be so constituted that markings, due to electrical discharges, are prevented or minimized to a harmless amount. Other objects will hereinafter appear.

Due to the manipulation of sensitive photographic film, some times in manufacture, but more frequently in use, characteristic lines or patches may appear on development, because of electrical discharges which are created during the handling. The fog or fog lines which are thus formed on the film are particularly noticeable in the case of the standard species of motion picture film, which includes a nitrocellulose support or base. It is very important from the commercial standpoint to prevent this defect in motion picture art, particularly when making negative film strips. The trouble is commonly referred to as "static" and will be so designated herein.

While certain camera modifications for preventing this electrical trouble have been proposed, it is very desirable to prevent static by a proper constitution of the film, so that the latter may be employed in any commercial camera without any precautions being taken by the user. Of course, the film should likewise be capable of subsequent fluid treatment and drying on the customary racks or apparatus without injury.

I have discovered that film having unexpectedly strong antistatic properties may be prepared by providing the film base with a layer comprising an ether of cellulose. Such ethers may be used alone or combined with other substances, such as cellulose esters, like cellulose nitrate and cellulose acetate.

In the accompanying drawing,—

Figure 1:
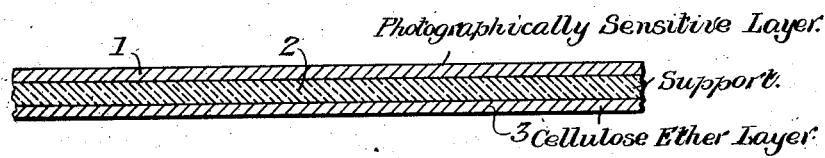
Fig. 1 shows a section on an exaggerated scale of a film strip embodying the preferred form of my invention.

In the drawing, 2 represents the flexible transparent base or support which may be composed of any of the better known materials, such as nitrocellulose, the usual softeners and modifying agents being present if desired. On this is coated the light sensitive-layer 1, which, in the customary form in this art, is a gelatino silver-haloid emulsion. At 3 is indicated the anti-static coating, which, in the preferred form, is placed upon the back of the support 2, that is, upon the face of the support which is opposite to the sensitive layer 1.

I will now give several examples of various modifications of my invention, but they are purely illustrative and may be widely varied. The proportions are by weight. I may, for example, form the layer of 3, which is usually very thin, out of cellulose ether alone. For instance, I may dissolve 90 parts of ethyl cellulose of the kind that is insoluble in water and is not injuriously softened thereby, in a mixture of chloroform and alcohol of varying proportions, say, for instance, 50 parts of ethyl alcohol and 900 parts of chloroform. This solution may be coated upon the support 2. But in order to insure even greater adhesion of the support and the ether layer, I strongly prefer to add an amount of solvent which will slightly act on the support to cause intimate surface union. Thus to the hereinabove mentioned composition I may add 3000 parts of acetone, at the same time further diluting the mixture with 550 parts of ethyl alcohol. The acetone does not precipitate the ether under these conditions. When the composition containing the alkyl ether of cellulose, a compound solvent for the same, and the acetone and additional alcohol is coated in a thin layer on the back of the film, say one of nitrocellulose, it rapidly dries and adheres to the latter, forming a mechanically integral structure, the volatile ingredients evaporating sufficiently to set the layer and leave a coating or backing which is comprised essentially of cellulose ether.

Figure 3:
Figure 4:

The coating of ether may be made less expensive if modified to include a cellulose ester, such as cellulose nitrate. A compound coating or layer thus constituted is a very effective anti-static medium. I may first dissolve the ether and ester in their solvents and then combine the two thereafter, adding a proper amount of adhesion-promoting ingredients, together with a diluent that permits its use without precipitation. By way of illustration, 45 parts of ethyl cellulose, of the kind that is insoluble in water and not injuriously softened thereby, may be dissolved in 50 parts of ethyl alcohol and 900 parts of chloroform. Then 45 parts of cellulose nitrate are made into a clear solution with acetone. The ether and nitrate solutions are then homogeneously mixed and finally there is added sufficient acetone to bring the total up to 4000 parts and at the same time sufficient ethyl alcohol is added to the amount, say of 550 parts. The resulting dilute solution, when coated on film base, say of the usual nitrocellulose variety, forms a layer comprising essentially an alkyl ether of cellulose and cellulose nitrate which has valuable static preventing qualities and at the same time allows the film to be used in the customary manner throughout the entire motion picture manipulations. In Fig. 3 the photographically sensitive layer is shown at 1 on the intermediate layer or support 2, the latter carrying on its opposite face, as shown at 31, a layer containing cellulose ether and a cellulose ester, such as cellulose nitrate. In Fig. 4 the photographically sensitive layer is shown at 1. It rests directly upon the layer 31 containing cellulose ether and the cellulose ester, such as cellulose nitrate. In back of layer 31 is the support 2.

Figure 5:
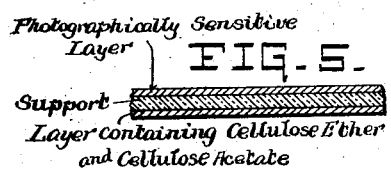
Figure 6:

Instead of cellulose nitrate, cellulose acetate, of the acetone-soluble species, may be substituted for the cellulose nitrate in the formula given in the preceding paragraph. But this species of my invention, in which cellulose ether and cellulose acetate are combined, is not claimed specifically herein, but is covered in my co-pending application filed of even date herewith, Serial No. 446,783. In Fig. 5 I have shown a photographically sensitive layer 1 resting upon the support 2, the latter having on its opposite face a layer 32 containing cellulose ether and cellulose acetate. In Fig. 6 I have shown the photographically sensitive layer 1 resting directly upon the layer 32 containing the cellulose ether and cellulose acetate, the support 2 being on the opposite face of layer 32.

Cellulose ethers vary in the amount by which they shrink when films containing them pass through the usual photographic baths and are then dried. While I prefer to use those ethers in which this shrinkage is substantially inconsequential, I may, nevertheless, in certain forms of my invention, employ ether prepared in such a way that it has a noticeable tendency to shrink during the photographic treatment. Since this shrinkage occurs at the same time, and from the same causes, as the shrinkage of the gelatino layer 1, it can to a certain extent counteract the latter and thus tend to oppose the curling tendencies in the completed negatives.

Figure 2:
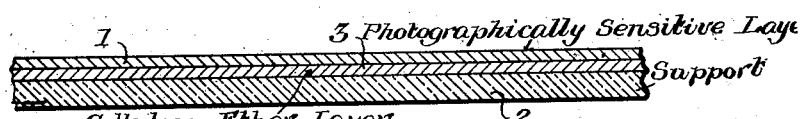
Figs. 2, 3, 4, 5 and 6 show in section on an exaggerated scale modified forms of the invention.

While I prefer to have the layer 3 on the rear of the film, as shown in Fig. 1, nevertheless, a useful photographic film may be constituted, as shown in Fig. 2, with the ether containing layer 3 between the support 2 and the sensitive layer 1 carried thereon.

All of the above compositions give transparent, hard, flexible, thin anti-static coatings or layers which are satisfactorily resistant to photographic manipulations and treatment.

The composition hereinabove disclosed is claimed in my co-pending divisional application, Serial No. 543,530, filed Mar. 13, 1922, for composition of matter for use in film making.

Having thus described my invention, what I claim as new and desire to secure by Letters Patent is:

1. A photographic film comprising a film support, a photographically sensitive layer carried thereby and forming one surface of the film, and a layer comprising an ether of cellulose.

2. A photographic film comprising a film support, a photographically sensitive layer carried thereby and forming one surface of the film, and a layer comprising an alkyl ether of cellulose.

3. A photographic film comprising a film support, a photographically sensitive layer carried thereby, and a layer comprising an alkyl ether of cellulose and a cellulose ester.

4. A photographic film comprising a film support, a photographically sensitive layer carried thereby, and a layer comprising ethyl cellulose and cellulose nitrate.

5. A photographic film comprising a support which tends to produce static, a photographically sensitive layer carried thereby and forming one surface of the film, and an antistatic layer comprising an ether of cellulose.

6. A photographic film comprising a support which tends to produce static, a photographically sensitive layer carried thereby and forming one surface of the film, and an antistatic layer comprising ethyl cellulose.

7. A film comprising a support which tends to produce static, a photographically sensitive layer carried thereby, and an antistatic layer comprising an alkyl ether of cellulose and a cellulose ester.

8. A photographic film comprising a support which tends to produce static, a photographically sensitive layer carried thereby and an antistatic layer comprising ethyl cellulose and cellulose nitrate.

9. A photographic film comprising a layer of cellulose nitrate, a photographically sensitive layer carried thereon, and a second layer thereon comprising an alkyl ether of cellulose.

10. A photographic film comprising a layer of cellulose nitrate, a photographically sensitive layer carried thereon and a second layer thereon comprising ethyl cellulose.

11. A photographic film comprising a layer of cellulose nitrate, a photographically sensitive layer carried thereon, and a second layer thereon comprising an alkyl ether of cellulose and a cellulose ester.

12. A photographic film comprising a support of cellulose nitrate, a photographically sensitive layer carried thereby, and a backing comprising ethyl cellulose and cellulose nitrate.

Signed at Rochester, New York, this 14th day of February, 1921.

ALBERT F. SULZER.